US012205510B2

(12) United States Patent
Bae et al.

(10) Patent No.: US 12,205,510 B2
(45) Date of Patent: Jan. 21, 2025

(54) SPATIOTEMPORAL DITHER FOR PULSED DIGITAL DISPLAY SYSTEMS AND METHODS

(71) Applicant: Apple Inc., Cupertino, CA (US)

(72) Inventors: Hopil Bae, Pala Alto, CA (US); Xiang Lu, Campbell, CA (US); Haitao Li, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/318,484

(22) Filed: May 16, 2023

(65) Prior Publication Data

US 2024/0021132 A1 Jan. 18, 2024

Related U.S. Application Data

(60) Provisional application No. 63/389,298, filed on Jul. 14, 2022.

(51) Int. Cl.
*G09G 3/20* (2006.01)
*G09G 3/32* (2016.01)

(52) U.S. Cl.
CPC ......... *G09G 3/2051* (2013.01); *G09G 3/2022* (2013.01); *G09G 3/32* (2013.01); *G09G 2310/08* (2013.01); *G09G 2320/0247* (2013.01)

(58) Field of Classification Search
CPC ........ G09G 3/2022–204; G09G 3/2044–2055; G09G 2320/0247; G09G 3/32; G09G 2320/0266; G09G 2300/0452; G09G 3/3614; G09G 2320/0233; G09G 3/3607; G09G 2340/0457; G09G 3/2029; G09G 3/2051; G09G 3/2025
See application file for complete search history.

(56) References Cited

U.S. PATENT DOCUMENTS

| | | | | |
|---|---|---|---|---|
| 6,091,398 | A | 7/2000 | Shigeta | |
| 7,190,380 | B2 | 3/2007 | Damera-Venkata et al. | |
| 2017/0358255 | A1* | 12/2017 | Wang | G09G 3/2055 |
| 2018/0130400 | A1* | 5/2018 | Meitl | G09G 3/007 |
| 2019/0279553 | A1* | 9/2019 | Vahid Far | G06F 3/04166 |
| 2021/0027694 | A1 | 1/2021 | Buckley | |

* cited by examiner

*Primary Examiner* — Sanjiv D. Patel
(74) *Attorney, Agent, or Firm* — Fletcher Yoder P.C.

(57) ABSTRACT

In accordance with embodiments of the present disclosure, a device may include a pulsed emission electronic display having multiple display pixels in order to display an image frame. The display may pulse one or more display pixels of over a plurality of sub-frames within the image frame based on display image data. The device may also include image processing circuitry to generate the display image data based on source image data indicative of an image to be displayed during the image frame. Additionally, the image processing circuitry may dither an order of the plurality of sub-frames.

20 Claims, 13 Drawing Sheets

SPATIOTEMPORAL DITHER FOR PULSED DIGITAL DISPLAY SYSTEMS AND METHODS

CROSS-REFERENCE TO RELATED APPLICATIONS

This application claims priority to U.S. Provisional Application No. 63/389,298, filed on Jul. 14, 2022, and entitled "Spatiotemporal Dither for Pulsed Digital Display Systems and Methods," the contents of which is hereby incorporated by reference in its entirety.

SUMMARY

This disclosure relates to dithering for a pulsed electronic display to increase image quality.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with embodiments of the present disclosure, some electronic displays (e.g., micro-light-emitting-diode (LED) displays) may use pulsed light emissions such that the time averaged luminance output of a pixel is equivalent to the desired luminance level of the image data for that pixel. For example, a single image frame may be broken up into multiple (e.g., two, four, eight, sixteen, thirty-two, and so on) sub-frames, and a particular pixel may be illuminated (e.g., pulsed) or deactivated during each sub-frame such that the aggregate luminance output over the total image frame is equivalent to the desired luminance output of the particular pixel. In other words, the duration and frequency of the pixel emissions (e.g., pulses) during an image frame may be regulated to maintain an average luminance output during the image frame that appears to a viewer as the desired luminance output. However, at low target luminance levels (e.g., gray level 1/255, 2/255, etc.) the low frequency of pulses (e.g., a single pulse per image frame, two pulses per image frame, etc.) may become visible to the viewer, which may appear as flickering on the screen. Such flickering may be more prevalent at reduced frame rates (e.g., image frame rates less than 60 Hz).

As such, to reduce the likelihood of visible flickering, pixels may be grouped together (e.g., in 2×2 groupings, 4×4 groupings, etc.), and the pulsing of the pixels through the sub-frames of the image frame may be spatiotemporally dithered amongst the grouped pixels. In other words, the ordering of the sub-frames associated with a particular luminance output may be spatiotemporally dithered such that the sub-frames of the pixels in the pixel grouping are out of phase, relative to one another. For example, while in-phase, the pixels of the pixel grouping having the same target luminance may pulse during the same sub-frame(s), and a viewer may recognize the pulsing of the pixels as flicker. However, when spatiotemporally dithered, the pixels of the pixel grouping may be out of phase, such that the pixels pulse at different sub-frames, increasing the effective (e.g., perceived) frame rate to reduce or eliminate visual artifacts such as flickering while maintaining a spatiotemporal average luminance level equivalent to the desired luminance level.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
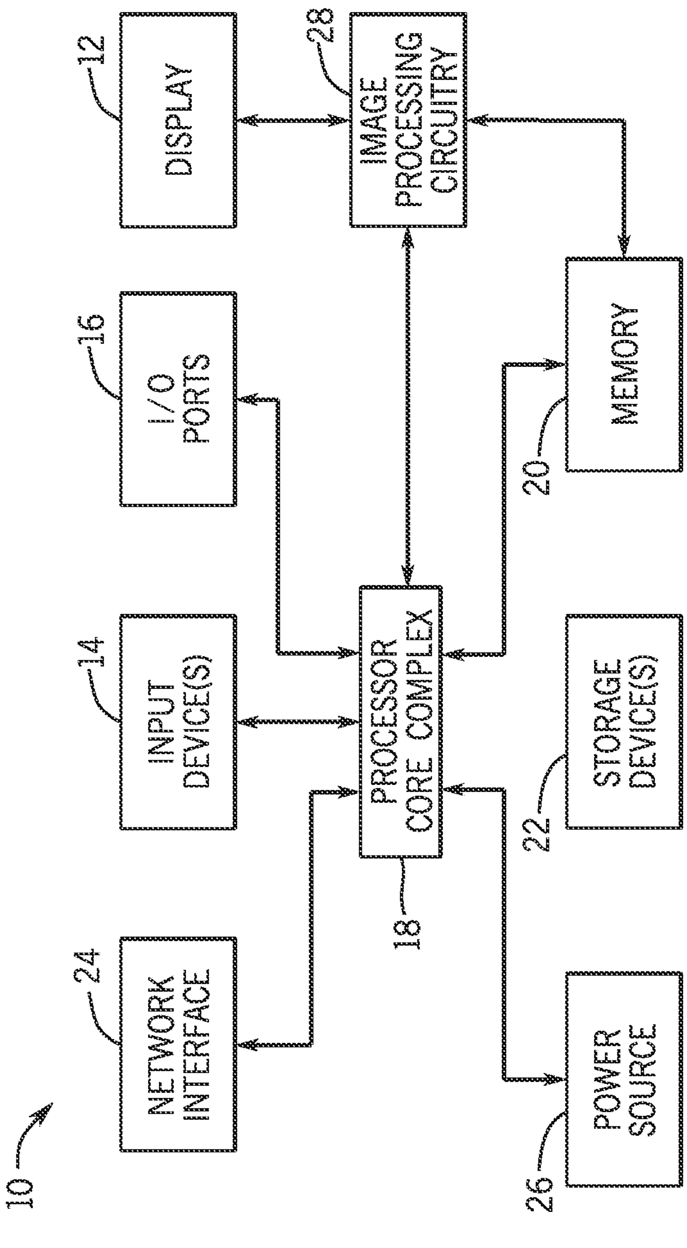
FIG. 1 is a block diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). As should be appreciated, color components other than RGB may also be used such as CMY (i.e., cyan, magenta, and yellow). Additionally or alternatively, image data may be indicated by a luma channel and one or more chrominance channels (e.g., YCbCr, YUV, etc.), grayscale (e.g., gray level), or other color basis. It should be appreciated that image data and/or particular channels of image data (e.g., a luma channel), as disclosed herein, may encompass linear, non-linear, and/or gamma-corrected luminance values.

To display images, the electronic display may illuminate one or more pixels according to the image data. In general electronic displays may take a variety of forms and operate by reflecting/regulating a light emission from an illuminator (e.g., backlight, projector, etc.) or generate light at the pixel level, for example, using self-emissive pixels such as micro-light-emitting diodes (LEDs) or organic light-emitting diodes (OLEDs). In some embodiments, the electronic display may display an image by pulsing light emissions from pixels such that the time averaged luminance output is equivalent to the desired luminance level of the image data. For example, a single image frame may be broken up into multiple (e.g., two, four, eight, sixteen, thirty-two, and so on) sub-frames, and a particular pixel may be illuminated (e.g., pulsed) or deactivated during each sub-frame such that the aggregate luminance output over the total image frame is equivalent to the desired luminance output of the particular pixel. In other words, the duration and frequency (e.g., as opposed to the brightness) of the pixel emissions during an image frame may be regulated to maintain an average luminance output during the image frame that appears to the human eye as the desired luminance output.

In some embodiments, the electronic display may be a micro-LED display having active matrixes of micro-LEDs, pixel drivers (e.g., micro-drivers), anodes, and arrays of row and column drivers. While discussed herein as relating to micro-LED displays, as should be appreciated, the features discussed herein may be applicable to any suitable display that using pulsed light emissions to generate an image on the electronic display. Each micro-driver may drive a number of display pixels on the electronic display. For example, each micro-driver may be connected to numerous anodes, and each anode may selectively connect to one of multiple different display pixels. Thus, a collection of display pixels may share a common anode connected to a micro-driver. The micro-driver may drive a display pixel by providing a driving signal across an anode to one of the display pixels. Any suitable number of display pixels may be located on respective anodes of the micro-LED display. Moreover, in some embodiments, the collection of display pixels connected to each anode may be of the same color component (e.g., red, green, or blue).

Additionally, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, contrast control, and/or other factors that may cause distortions or artifacts perceivable to a viewer. In particular, electronic displays with pulsed light emissions may produce an undesired flickering effect, and the image data may be processed (e.g., via spatially and/or temporally dithering) to reduce or eliminate such visual artifacts. For example, image data corresponding to certain luminance levels (e.g., darker or lower luminance levels) may be pulsed less frequently during the image frame. Moreover, in some embodiments, it may be desirable to reduce the frame rate of the electronic display (e.g., to reduce power consumption). However, for target luminance levels that correspond to a reduced number pulses (e.g., a gray level of 1/255, 2/255, or 3/255, etc.) during the image frame, the pulsing of the pixels may become apparent to a viewer. Such visual artifacts may become even more prevalent at reduced frame rates (e.g., frame rates less than 60 hertz (Hz)) and/or when multiple pixels in the same area are also at luminance levels corresponding to a reduced number of pulses.

In some embodiments, the image data may be spatially, temporally, or spatiotemporally dithered to reduce the likelihood of visual pulsing of the pixels. For example, even if multiple pixels in the same area of the electronic display are at luminance levels corresponding to the reduced number of pulses, by dithering the image data, in-phase pulsing of the pixels may be reduced such that to a viewer, the pixel outputs appear steady, and the aggregate luminance values appear equivalent to the desired luminance levels.

With the foregoing in mind, FIG. 1 is an example electronic device 10 with an electronic display 12 having independently controlled color component illuminators (e.g., projectors, backlights, etc.). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
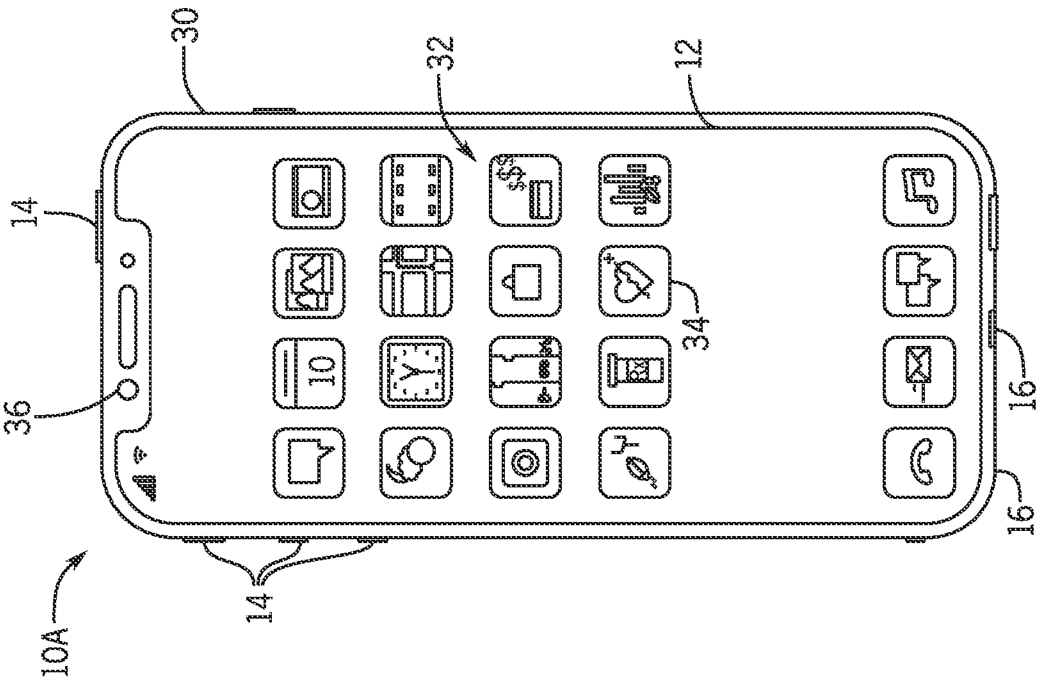
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
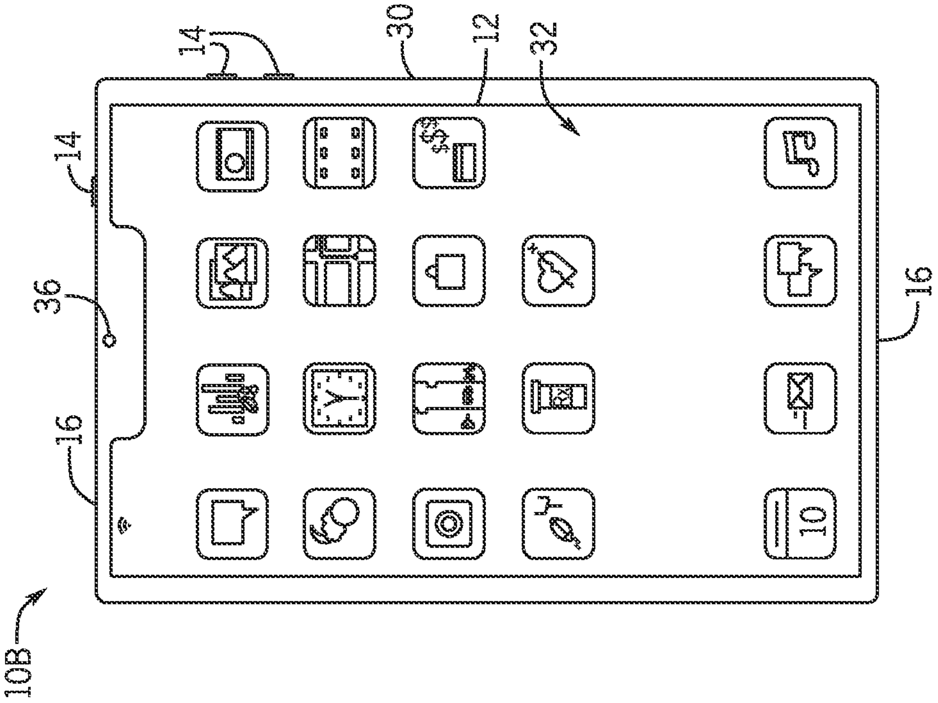
FIG. 3 is another example of the electronic device of FIG. 1 in the form of a tablet device, in accordance with an embodiment.
Figure 4:
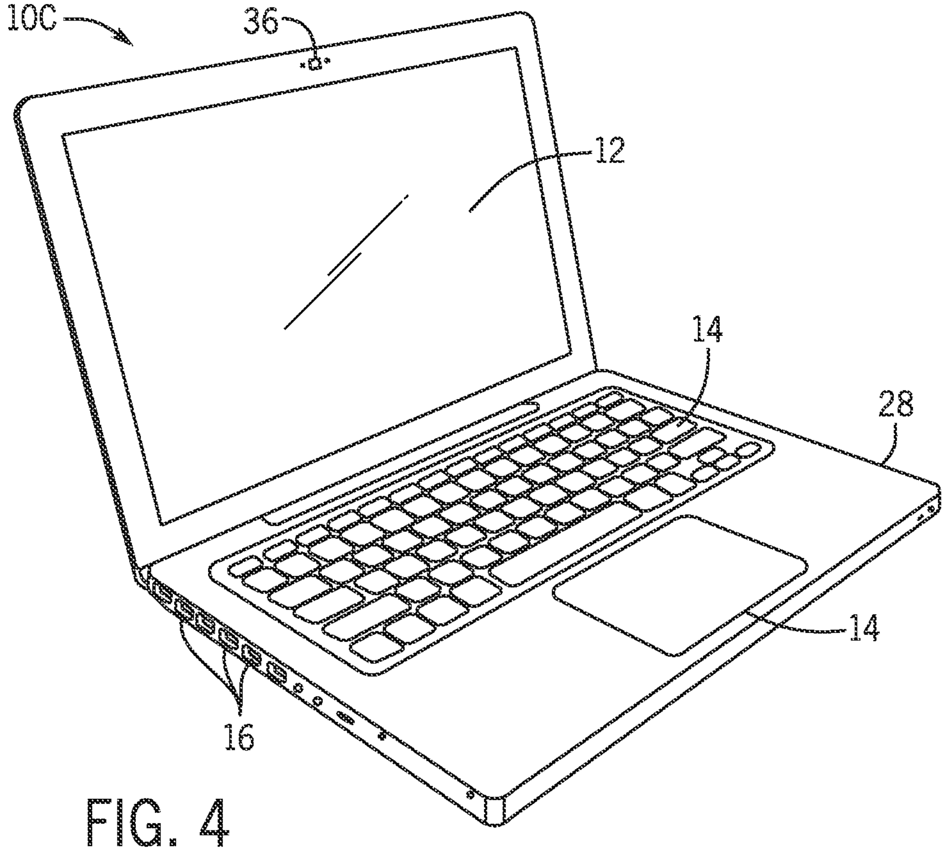
FIG. 4 is another example of the electronic device of FIG. 1 in the form of a computer, in accordance with an embodiment.
Figure 5:
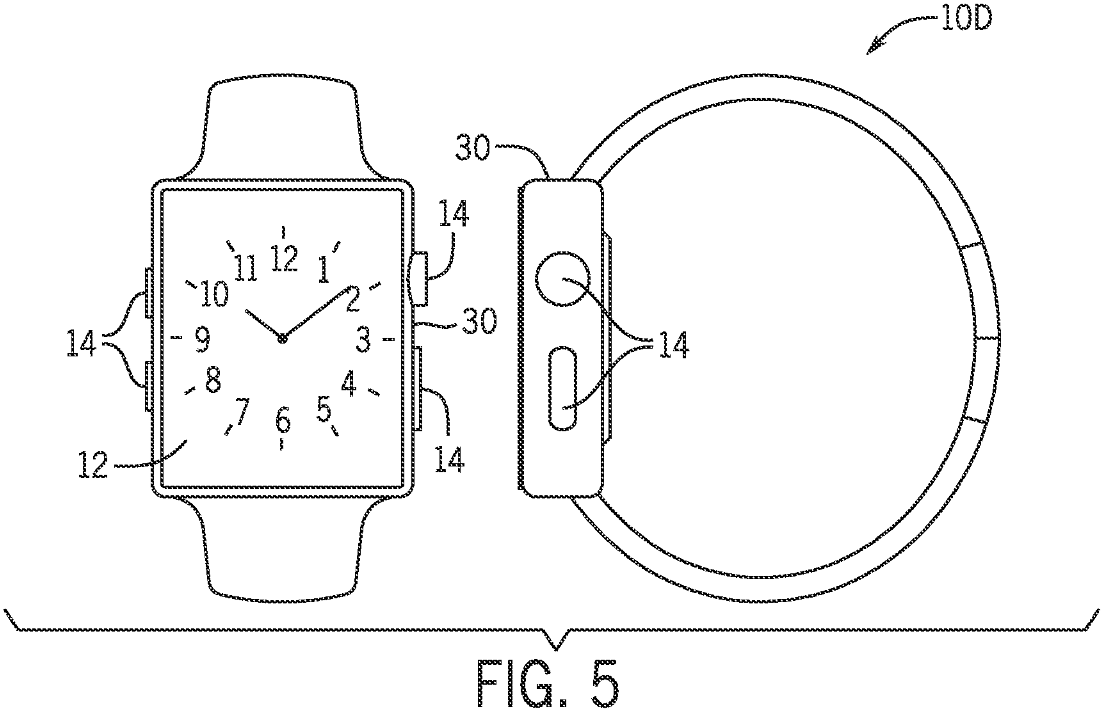
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
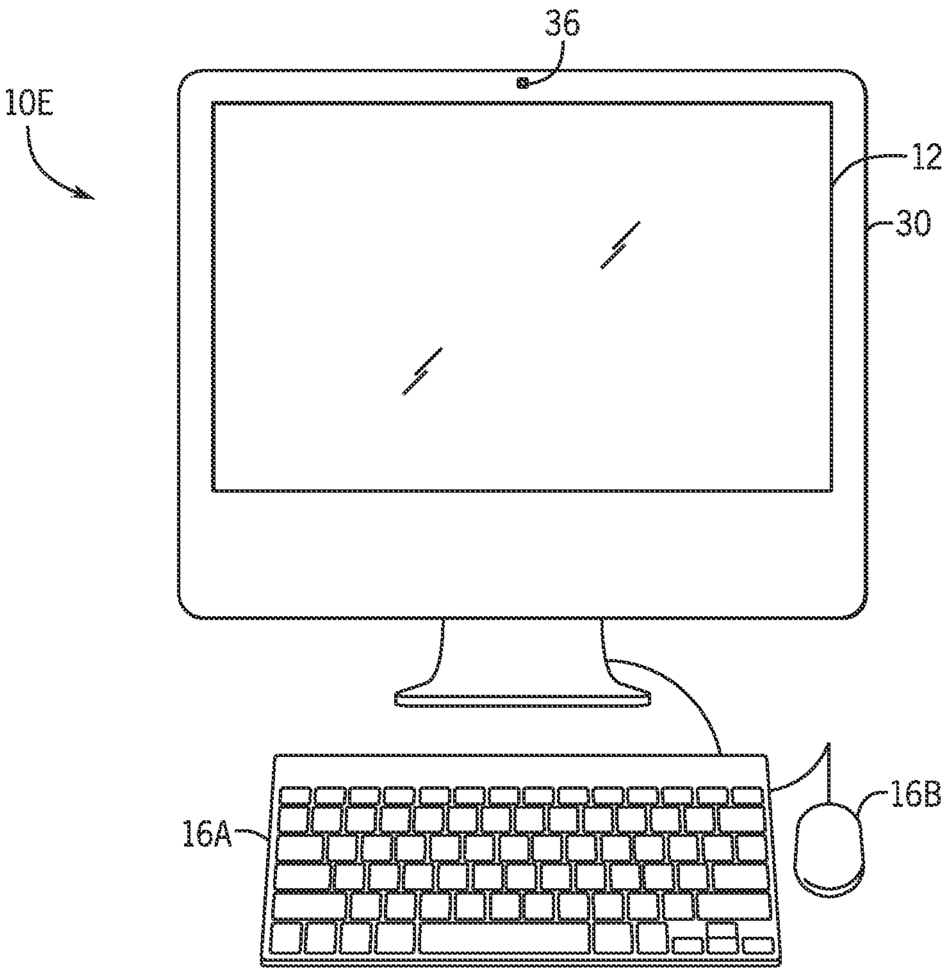
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As discussed above, the electronic device 10 may include one or more electronic displays 12 of any suitable type. In some embodiments, the electronic display 12 may be a micro-LED display having a display panel 40 that includes an array of micro-LEDs (e.g., red, green, and blue micro-LEDs) as display pixels. Support circuitry 42 may receive display image data 44 (e.g., RGB-format video image data) and send control signals 46 to an array 48 micro-drivers 50. As should be appreciated, the display image data 44 may be of any suitable format depending on the implementation (e.g., type of display). In some embodiments, the support circuitry 42 may include a video timing controller (video TCON) and/or emission timing controller (emission TCON) that receives and uses the display image data 44 in a serial bus to determine a data clock signal and/or an emission clock signal to control the provisioning of the display image data 44 to the display panel 40. The video TCON may also pass the display image data 44 to serial-to-parallel circuitry that may deserialize the display image data 44 into several parallel image data signals. That is, the serial-to-parallel circuitry may collect the display image data 44 into the control signals 46 that are passed on to specific columns of the display panel 40. The control signals 46 (e.g., data/row scan controls, data clock signals, and/or emission clock signals) for each column of the array 48 may contain luminance values corresponding to pixels in the first column, second column, third column, fourth column . . . and so on, respectively. Moreover, the control signals 46 may be arranged into more or fewer columns depending on the number of columns that make up the display panel 40.

Figure 7:
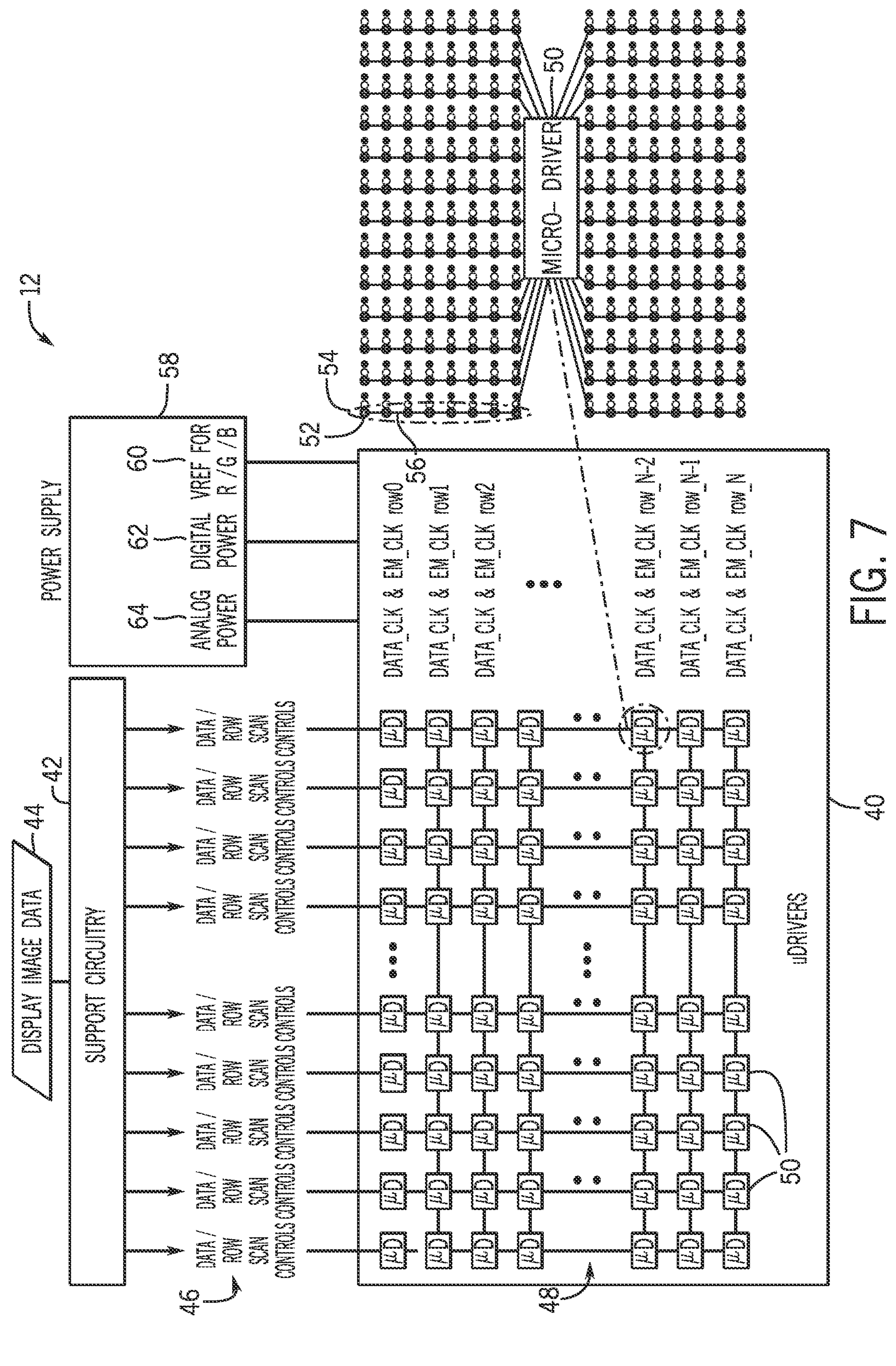
FIG. 7 is a schematic diagram of a micro-LED display that employs micro-drivers to drive display pixels with controls signals, in accordance with an embodiment.

The micro-drivers 50 may be arranged in an array 48, and each micro-driver 50 may drive a number of display pixels 52. Different display pixels 52 (e.g., display sub-pixels) may include different colored micro-LEDs (e.g., a red micro-LED, a green micro-LED, or a blue micro-LED) to emit light according to the display image data 44. Moreover, in some embodiments, the subset of display pixels 52 located at each anode 54 may be associated with a particular color (e.g., red, green, blue). Furthermore, although shown for only a single color channel, it should be appreciated that each anode 54 may have a respective cathode 56 associated with the particular color channel. For example, the depicted cathodes 56 may correspond to red color channels (e.g., subset of red display pixels 52). Indeed, there may be a second set of cathodes 56 that couple to a green color channels (e.g., subset of green display pixels 52) and a third set of cathodes 56 that couple to a blue color channels (subset of blue display pixels 52), but these are not expressly illustrated in FIG. 7 for ease of description.

Additionally, a power supply 58 may provide a reference voltage (VREF) 60 (e.g., to drive the micro-LEDs of the display pixels 52), a digital power signal 62, and/or an analog power signal 64. In some cases, the power supply 58 may provide more than one reference voltage 60 signal. For example, display pixels 52 of different colors may be driven using different reference voltages, and the power supply 58 may generate each reference voltage 60 (e.g., VREF for red, VREF for green, and VREF for blue display pixels 52). Additionally or alternatively, other circuitry on the display panel 40 may step a single reference voltage 60 up or down to obtain different reference voltages and drive the different colors of display pixels 52.

Figure 8:
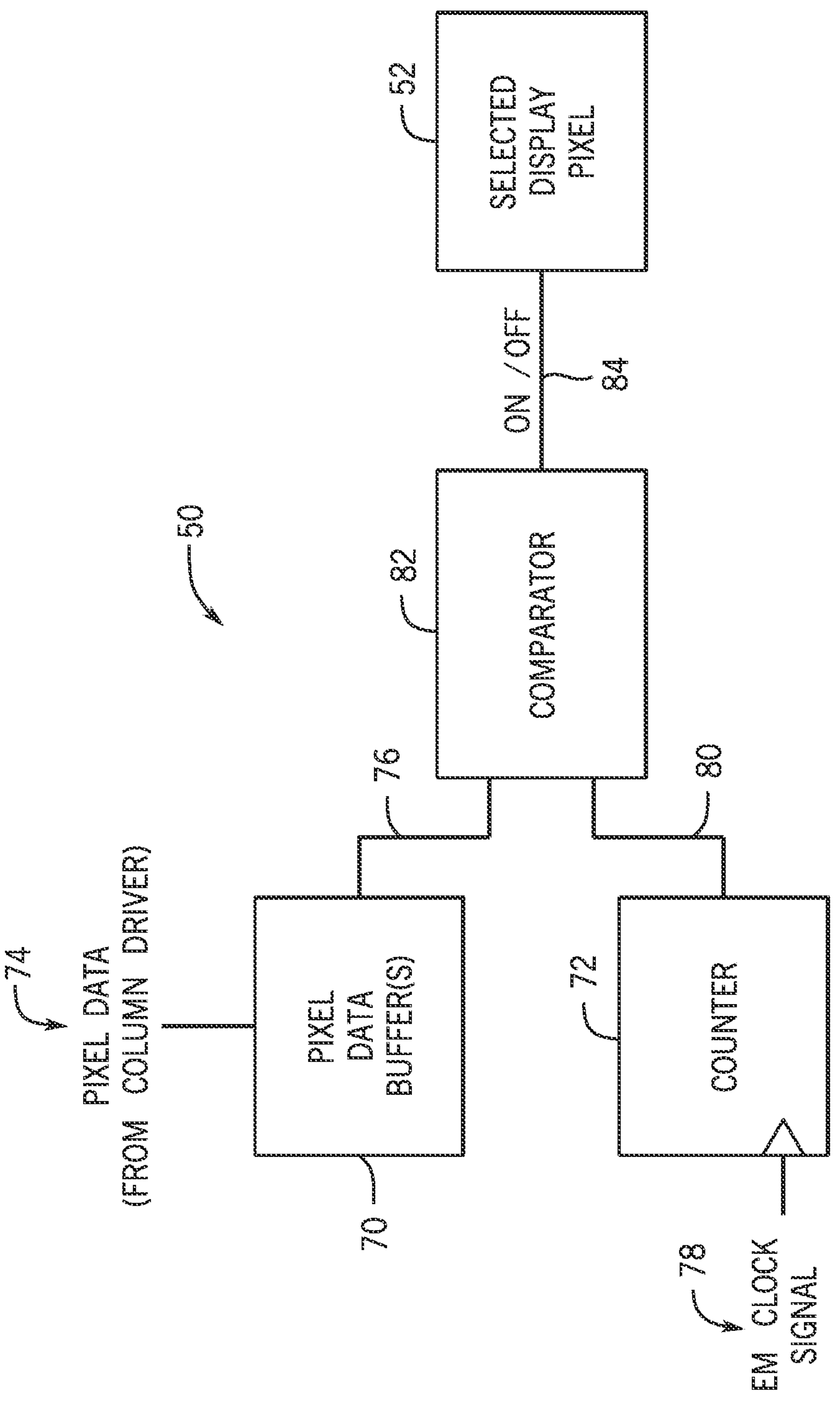
FIG. 8 is a block diagram of circuitry that may be part of a micro-driver of FIG. 7, in accordance with an embodiment.

The micro-drivers 50 may include pixel data buffer(s) 70 and/or a digital counter 72, as shown in FIG. 8. The pixel data buffer(s) 70 may include sufficient storage to hold pixel data 74 that is provided (e.g., via support circuitry 42 such as column drivers) based on the display image data 44. Moreover, the pixel data buffer(s) 70 may take any suitable logical structure based on the order that the pixel data 74 is provided. For example, the pixel data buffer(s) 70 may include a first-in-first-out (FIFO) logical structure or a last-in-first-out (LIFO) structure. Moreover, the pixel data buffer(s) 70 may output the stored pixel data 74, or a portion thereof, as a digital data signal 76 representing a desired gray level for a particular display pixel 52 that is to be driven by the micro-driver 50.

The counter 72 may receive the emission clock signal 78 and output a digital counter signal 80 indicative of the number of edges (only rising, only falling, or both rising and falling edges) of the emission clock signal 78. The digital data signal 76 and the digital counter signal may enter a comparator 82 that outputs an emission control signal 84 in an "on" state when the digital counter signal 80 does not exceed the digital data signal 76, and an "off" state otherwise. The emission control signal 84 may be routed to driving circuitry (not shown) for the display pixel 52 being driven on or off. The longer the selected display pixel 52 is driven "on" by the emission control signal 84, the greater the amount of light that will be perceived by the human eye as originating from the display pixel 52.

Figure 9:
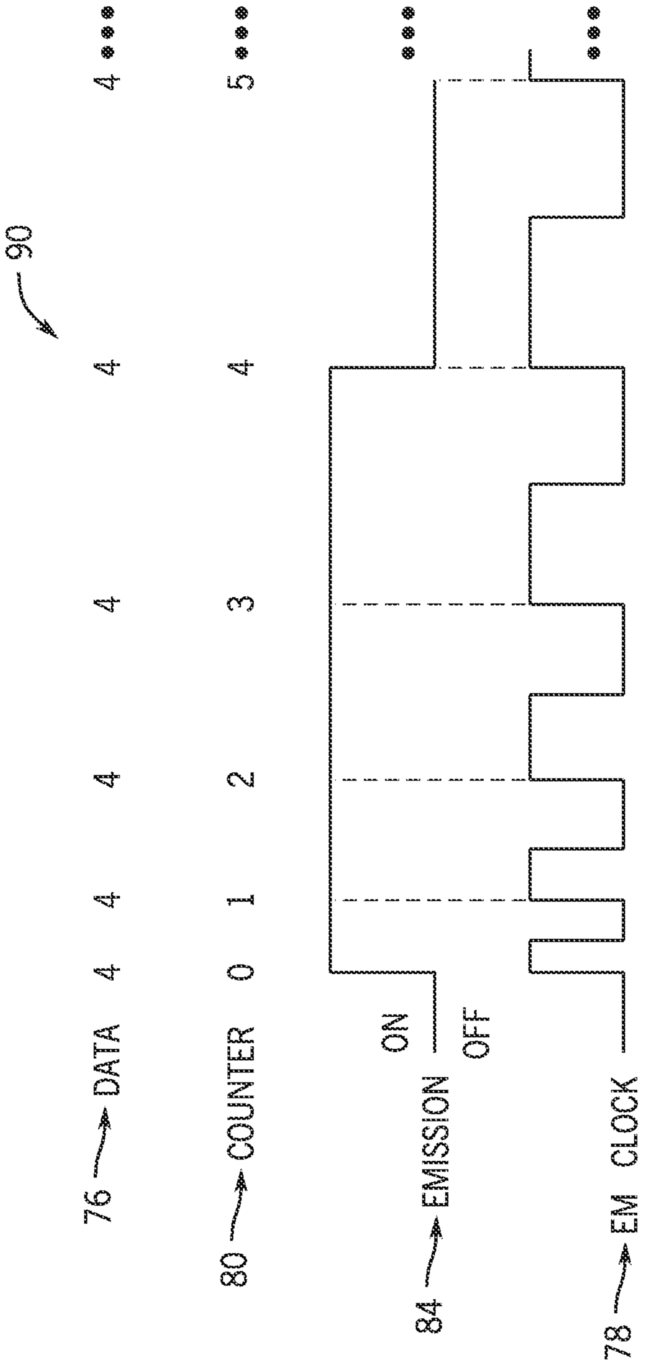
FIG. 9 is a timing diagram of an example operation of the circuitry of FIG. 8, in accordance with an embodiment.

To help illustrate, the timing diagram 90 of FIG. 9 provides an example of the operation of the micro-driver 50. The timing diagram 90 shows the digital data signal 76, the digital counter signal 80, the emission control signal 84, and the emission clock signal 78. In the example of FIG. 9, the gray level for driving the selected display pixel 52 is gray level 4, and this is reflected in the digital data signal 76. The emission control signal 84 drives the display pixel 52 to "on" for a period of time defined for gray level 4 based on the emission clock signal 78. Namely, as the emission clock signal 78 rises and falls, the digital counter signal 80 gradually increases. The comparator 82 outputs the emission control signal 84 to an "on" state as long as the digital counter signal 80 remains less than the digital data signal 76. When the digital counter signal 80 reaches the digital data signal 76, the comparator 82 outputs the emission control signal 84 with an "off" state, thereby causing the selected display pixel 52 no longer to emit light.

It should be noted that the steps between gray levels are reflected by the steps between emission clock signal 78 edges. That is, based on the way humans perceive light, to notice the difference between lower gray levels, the difference between the amounts of light emitted between two lower gray levels may be relatively small, and to notice the difference between higher gray levels the difference between the amounts of light emitted between two higher gray levels may be comparatively greater. The emission clock signal 78 may, therefore, increase the time between clock edges as the frame progresses. The particular pattern of the emission clock signal 78, as generated by the emission TCON, may have increasingly longer differences between edges (e.g., periods) so as to provide a gamma encoding of the gray level of the display pixel 52 being driven.

As discussed above, an electronic display 12 may display an image by pulsing light emissions from display pixels 52 such that the time averaged luminance output is equivalent to the desired luminance level of the display image data 44. Furthermore, a single image frame may be broken up into multiple (e.g., two, four, eight, sixteen, thirty-two, and so on) sub-frames, and a particular pixel may be illuminated (e.g., pulsed) or deactivated during each sub-frame such that the aggregate luminance output over the total image frame is equivalent to the desired luminance output of the particular pixel. In other words, in addition to regulating the duration of the pixel emission during a sub-frame (e.g., as discussed above with reference to FIGS. 7-9) the frequency of the pixel emissions during an image frame may be regulated to maintain an average luminance output during the image frame that appears to the human eye as the desired luminance output. For example, source image data (e.g., indicative of an image) may be processed and split into separate sets of pixel data 74 for each sub-frame. As such, the gray level discussed with respect to the digital data signal 76 may or may not correlate directly to the source image data, as the source image data is representative of the gray level for the image frame, and the digital data signal 76 is representative of the luminance output for a sub-frame.

Figure 10:
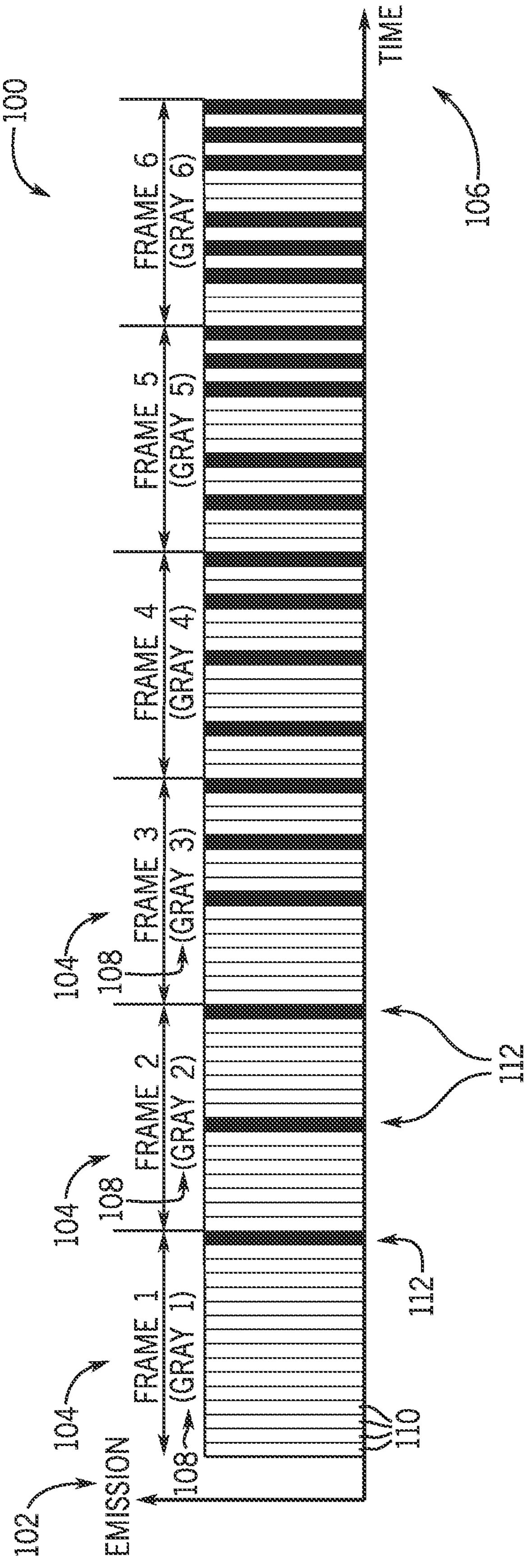
FIG. 10 is a graph of light emissions of six sequential image frames over time with increasing source image data gray level, in accordance with an embodiment.

To help illustrate, FIG. 10 is a graph 100 of the light emissions 102 of six sequential image frames 104 over time 106 with increasing source image data gray level 108. Each image frame 104 may progress over time 106 at a frame rate (e.g., 10 Hz, 15 Hz, 30 Hz, 60 Hz, 120 Hz, etc.) and include multiple sub-frames 110 operating at a partial frame rate (e.g., the number of sub-frames per image frame times the frame rate). In the depicted example, each image frame 104 includes sixteen sub-frames 110. To depict gray level 1, a single emission pulse 112 may be made during one sub-frame 110. To achieve gray level 2, two emission pulses 112 may be made during a single sub-frame 110 and so on. To achieve higher gray levels, the duration of the emission pulses 112 may be increased as described with respect to FIGS. 8 and 9. As such, a combination of the frequency of emission pulses 112 and the duration of each emission pulse 112 during an image frame 104 may result in an aggregated and time averaged luminance output equivalent to the source image data.

Figure 11:
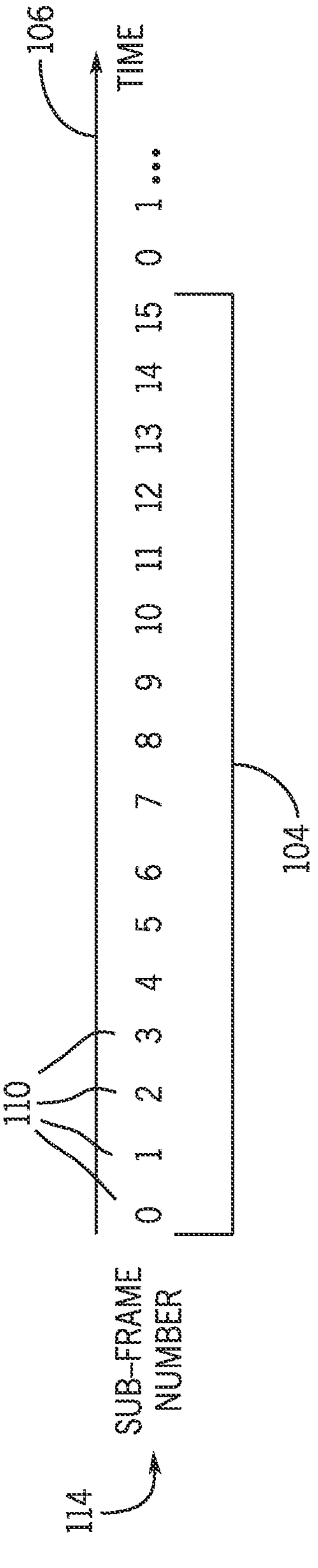
FIG. 11 is a diagram of sub-frame numberings over time, in accordance with an embodiment.

When the source image data is processed, the display image data 44 for each sub-frame 110 is generated, and may be set to occur at a designated time 106 (e.g., sub-frame number 114) during the image frame 104, as shown in FIG. 11. Moreover, in some embodiments, the sub-frame numbers 114 may be reorganized by temporally dithering (e.g., randomizing or rearranging) the order of the sub-frames 110 within the image frame 104. However, if multiple pixels in the same area of the display panel 40 are set to the same value, even with temporal dithering, some pixels may be "in-phase" (e.g., utilizing the same ordering of sub-frame numbers 114). Such in-phase coupling may result in perceivable flickering (e.g., perceivable emission pulses 112), especially at lower frame rates (e.g., less than 60 Hz) and low gray level (e.g., gray level 1, gray level 2, etc.). For example, at a frame rate of 30 Hz, gray level 1 may be characterized by single emission pulses 112 at a rate of 30 Hz, which may result in visible pulsing of the display pixel 52, especially when grouped with multiple other display pixels 52 at the same gray level. To reduce or eliminate such artifacts, the image processing circuitry 28 may temporally and spatially (e.g., spatiotemporally) dither the sub-frame numbers 114 as discussed further below.

Figure 12:
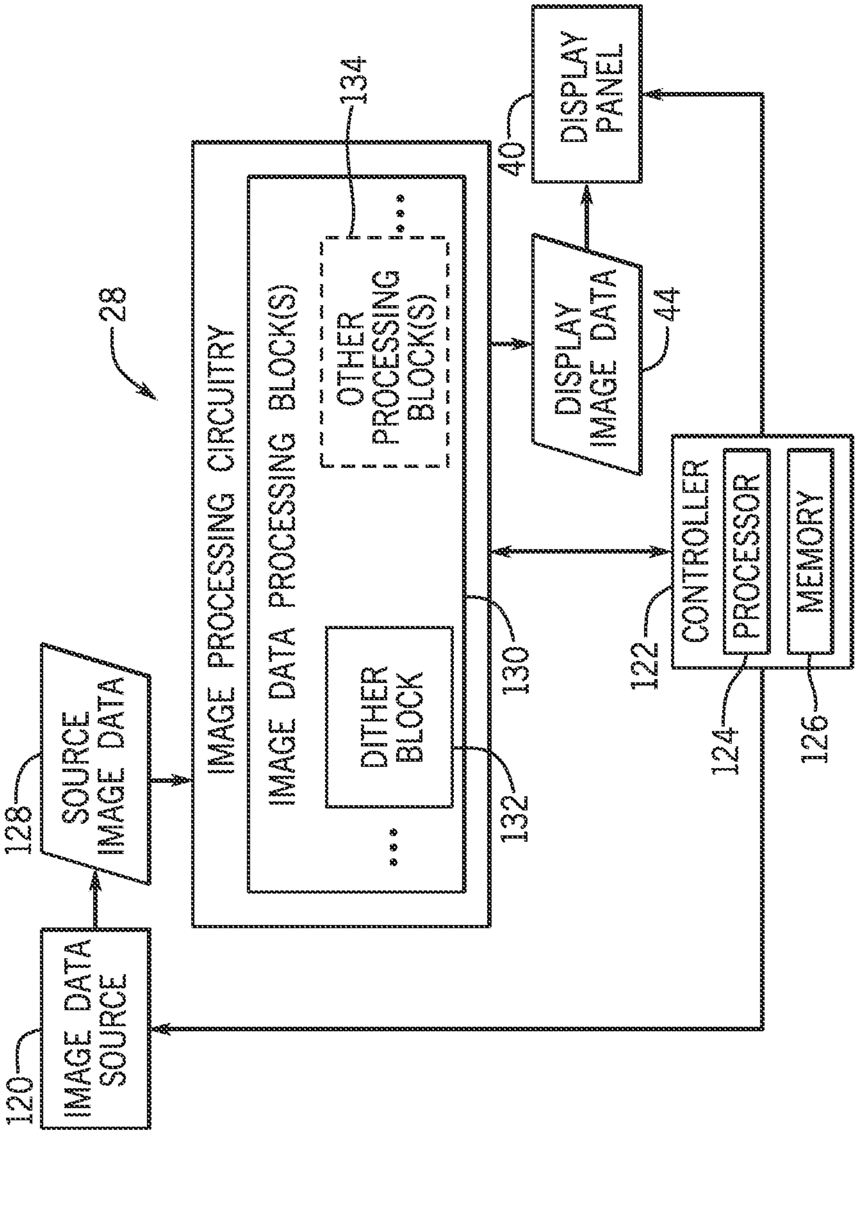
FIG. 12 is a block diagram of the image processing circuitry of FIG. 1 including a dither block, in accordance with an embodiment.

To help illustrate, a portion of the electronic device 10, including image processing circuitry 28, is shown in FIG. 12. The image processing circuitry 28 may be implemented in the electronic device 10, in the electronic display 12, or a combination thereof. For example, the image processing circuitry 28 may be included in the processor core complex 18, a timing controller (TCON) or the support circuitry 42 in the electronic display 12, or any combination thereof. As should be appreciated, although image processing is discussed herein as being performed via a number of image data processing blocks, embodiments may include hardware or software components to carry out the techniques discussed herein.

In addition to the display panel 40, the electronic device 10 may also include an image data source 120 and/or a controller 122 in communication with the image processing circuitry 28. In some embodiments, the controller 122 may control operation of the image processing circuitry 28, the image data source 120, and/or the display panel 40. To facilitate controlling operation, the controller 122 may include a controller processor 124 and/or controller memory 126. As should be appreciated, the controller processor 124 may be included in the processor core complex 18, the image processing circuitry 28, the electronic display 12, a separate processing module, or any combination thereof and execute instructions stored in the controller memory 126. Moreover, the controller memory 126 may be included in the local memory 20, the main memory storage device 22, a separate tangible, non-transitory, computer-readable medium, or any combination thereof. In general, the image processing circuitry 28 may process source image data 128 for display on one or more electronic displays 12. For example, the image processing circuitry 28 may include a display pipeline, memory-to-memory scaler and rotator (MSR) circuitry, warp compensation circuitry, or additional hardware or software means for processing image data. The source image data 128 may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

The image processing circuitry 28 may receive source image data 128 corresponding to a desired image to be displayed on the electronic display 12 from the image data source 120. The source image data 128 may indicate target characteristics (e.g., luminance data) corresponding to the desired image using any suitable source format, such as an RGB format, an αRGB format, a YCbCr format, and/or the like. Moreover, the source image data 128 may be fixed or floating point and be of any suitable bit-depth. Furthermore, the source image data 128 may reside in a linear color space, a gamma-corrected color space, or any other suitable color space. The image data source 120 may include captured images from cameras 36, images stored in memory, graphics generated by the processor core complex 18, or a combination thereof. Additionally, the image processing circuitry 28 may include one or more sets of image data processing blocks 130 (e.g., circuitry, modules, or processing stages) such as a dither block 132. As should be appreciated, multiple other processing blocks 134 may also be incorporated into the image processing circuitry 28, such as a color management block, a pixel contrast control (PCC) block, a burn-in compensation (BIC) block, a scaling/rotation block, etc. before and/or after the dither block 132. The image data processing blocks 130 may receive and process source image data 128 and output display image data 44 in a format (e.g., digital format and/or resolution) interpretable by the display panel 40 and/or its support circuitry 42. Further, the functions (e.g., operations) performed by the image processing circuitry 28 may be divided between various image data processing blocks 130, and, while the term "block" is used herein, there may or may not be a logical or physical separation between the image data processing blocks 130. Furthermore, while discussed herein as operating on source image data 128, as should be appreciated, source image data 128 may be considered as image data at any stage of image data processing prior to being split into multiple sub-frames 110, and the display image data 44 may be considered as image data at any stage of image data after having been split into multiple sub-frames. Moreover, the dither block 132 may be considered to dither the image data before or after the source image data 128 is split into multiple sub-frames 110 to form the display image data 44.

Returning to FIGS. 10 and 11, and as discussed above, electronic displays 12 with pulsed light emissions 102 may produce an undesired flickering effect, and the source image data 128 may be spatiotemporally dithered (e.g., via the dither block 132) to reduce or eliminate such visual artifacts. For example, the ordering of the sub-frame numbers 114 spatiotemporally dithered to avoid in-phase pulsing of the display pixels 52 so that to a viewer, the pixel outputs appear steady, and the aggregate luminance values appear equivalent to the desired luminance levels.

Figure 13:
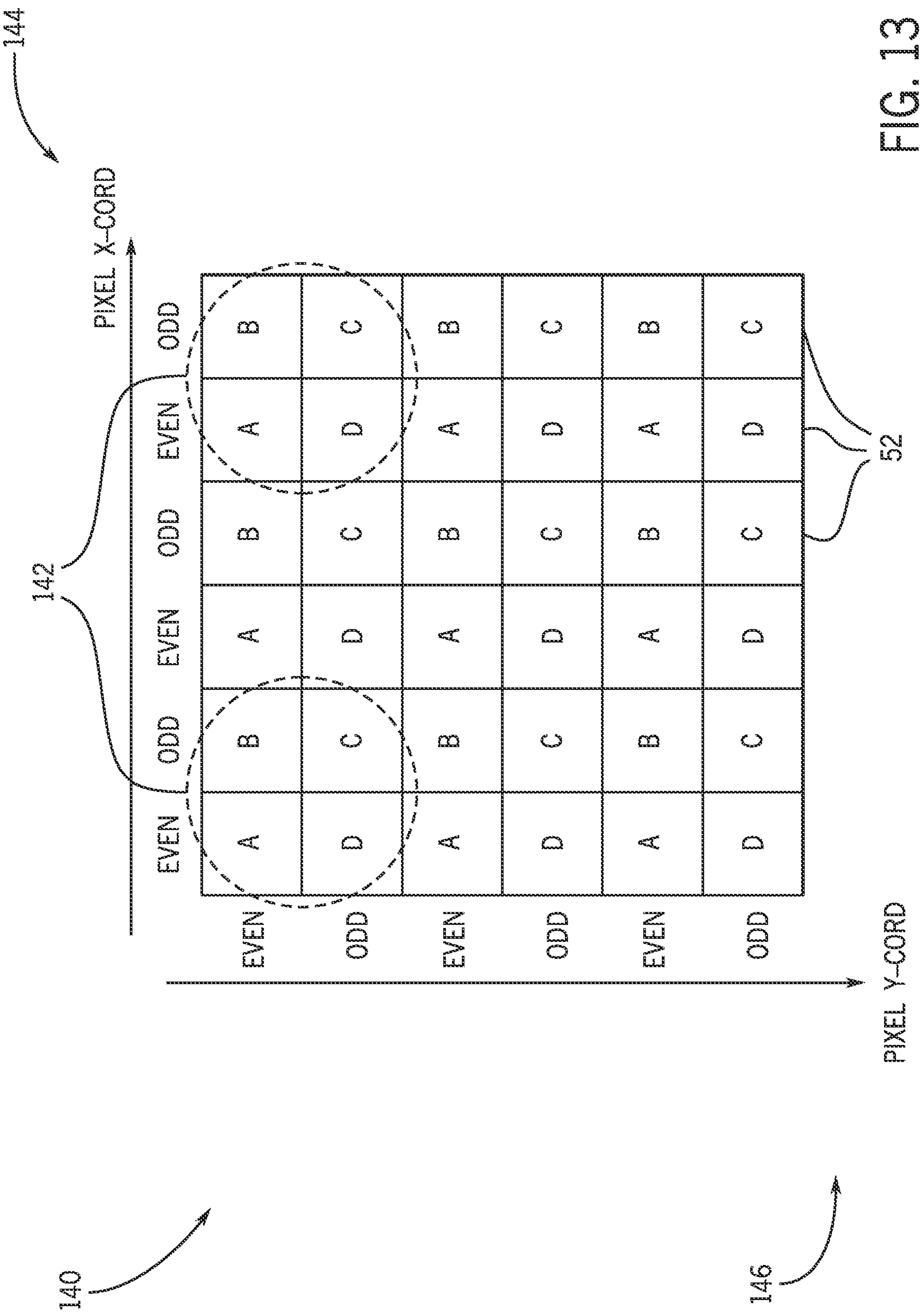
FIG. 13 is a diagram of a pixel grid having groupings of display pixels, in accordance with an embodiment.
Figure 14:
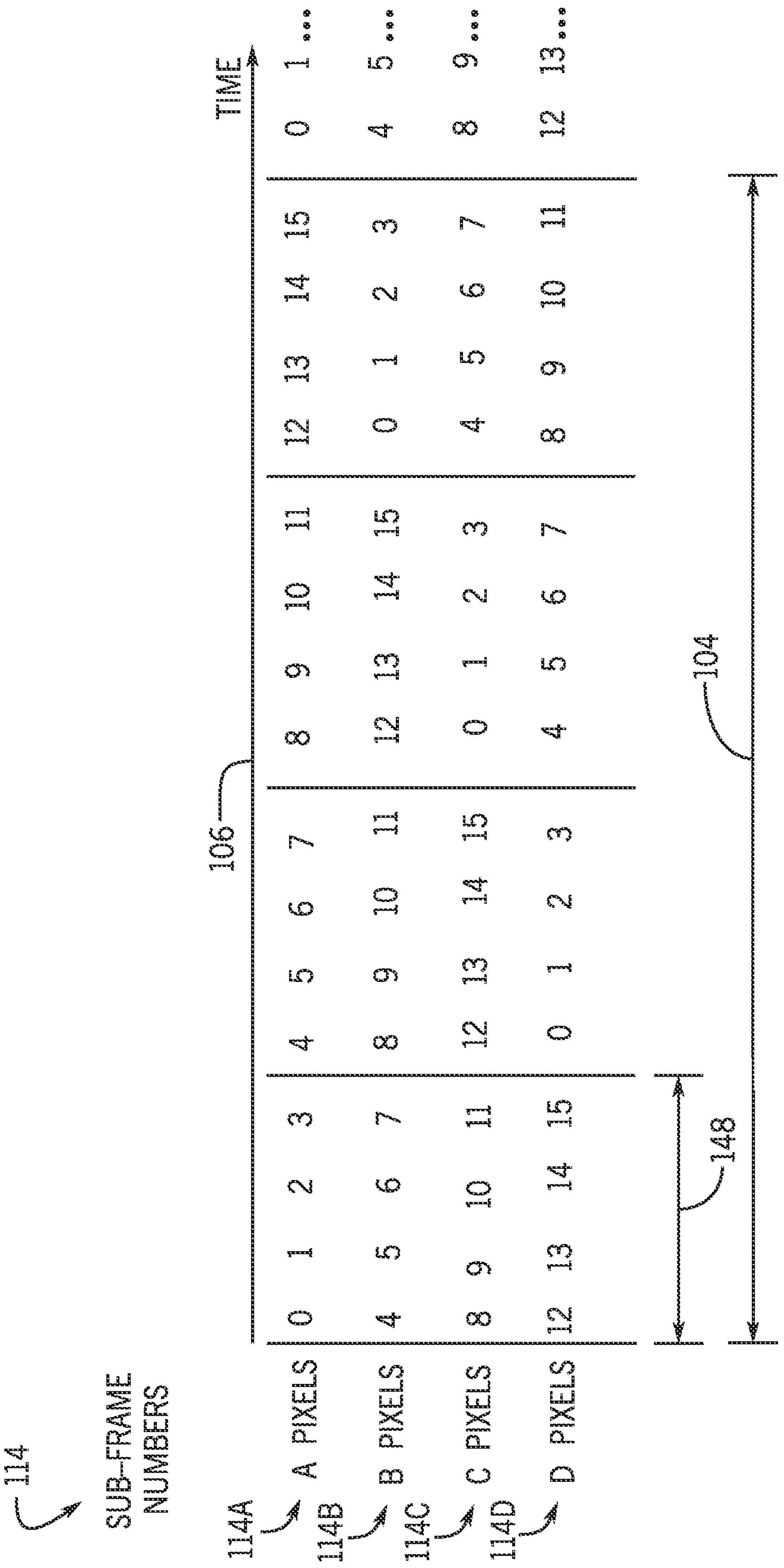
FIG. 14 is a diagram of sub-frame numberings over time, in accordance with an embodiment.

For example, in some embodiments, the display pixels 52 may be grouped as in the pixel grid 140 of FIG. 13. The groupings 142 of pixels may be based on pixel positions (e.g., a pixel x-coordinate 144 and a pixel y-coordinate) of the display pixels 52. For example, in some embodiments, 2×2 pixel groupings 142 may be used. As should be appreciated, a 2×2 pixel grouping is given as an example, and different pixel groupings 142 may be selected based on implementation (e.g., 1×2, 1×3, 3×3, 4×4, 2×4, etc.). Additionally, based on the pixel groupings 142, the arrangement of the sub-frame numbers 114 may be set such that the display pixels 52 of the grouping 142 are in different phases, as shown in FIG. 14. In the 2×2 pixel grouping example, the sub-frame numberings 114 (e.g., 114A, 114B, 114C, and 114D) of each display pixel 52 are 90 degrees out of phase. Moreover, in the depicted example, the set of aggregate outputs 148 of the 2×2 pixel grouping 142 over four sub-frames 110 includes each of the sub-frame numbers 114 of an image frame 104. As such, when taken as a whole, the grouping 142 allows for each of the sub-frame numbers 114 to be used in a fourth of the time 106 as a normal image frame 104, effectively increasing the frame rate (with respect to pixel groupings 142) by four.

Figure 15:
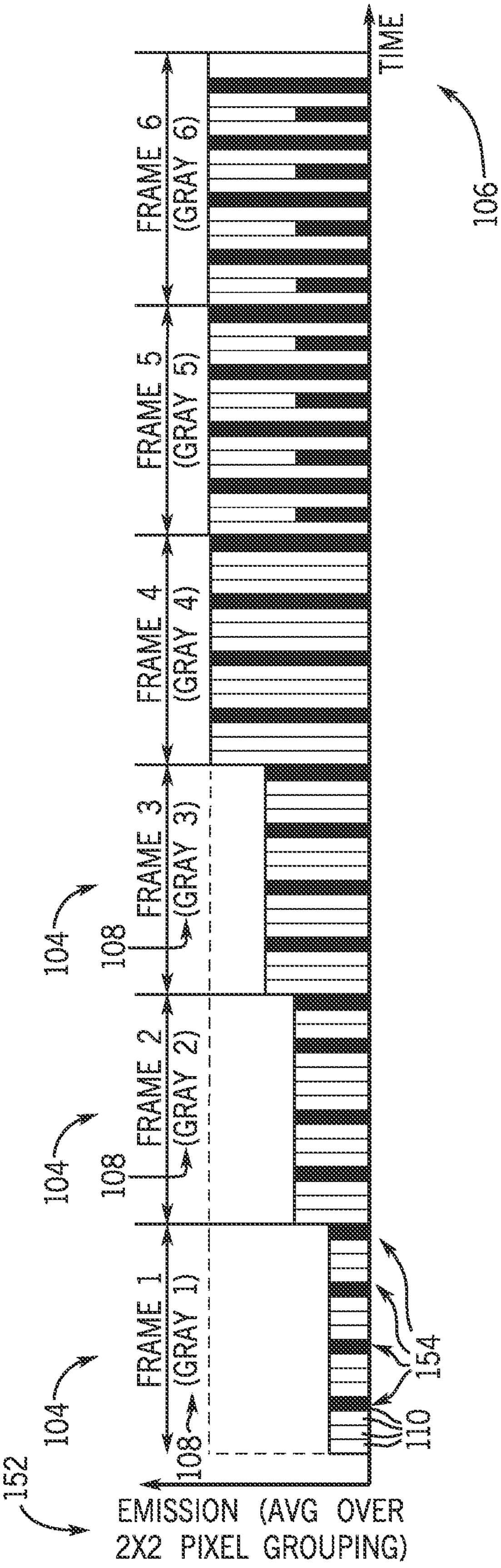
FIG. 15 is a graph of the average light emissions per area and per pixel for a 2×2 pixel grouping over six sequential image frames, in accordance with an embodiment.

To help illustrate, FIG. 15 is a graph 150 of the average light emissions 152 per area and per pixel for a 2×2 pixel grouping 142 over six sequential image frames 104 with increasing source image data gray level 108. In the depicted example, because the dithering includes spatial dithering (e.g., spatiotemporal dithering), the emission pulses 112 that would otherwise be independent of other display pixels 52 are instead averaged emission pulses 154 per pixel area. Returning to FIG. 10, without a spatial aspect to the dither, an emission pulse 112 for a gray level of one occurs during a single sub-frame, and such an emission pulse 112 may be in-phase with other emission pulses 112 of other nearby (e.g., less than one, two, or three display pixels 52 away) display pixels 52. However, as shown in FIG. 15, when considered as a grouping 142 and spatiotemporally dithered, the average emission pulse 154 for the grouping 142 may be perceived by a viewer and appear smoother (e.g., without or with reduced flickering). Indeed, as the human eye generally averages light spatially and temporally, by spatiotemporally dithering the sub-frame numbering 114 of pulsed display pixels 52, artifacts such as flickering may be reduced or eliminated and/or frame rates may be reduced without introducing such artifacts.

Figure 16:
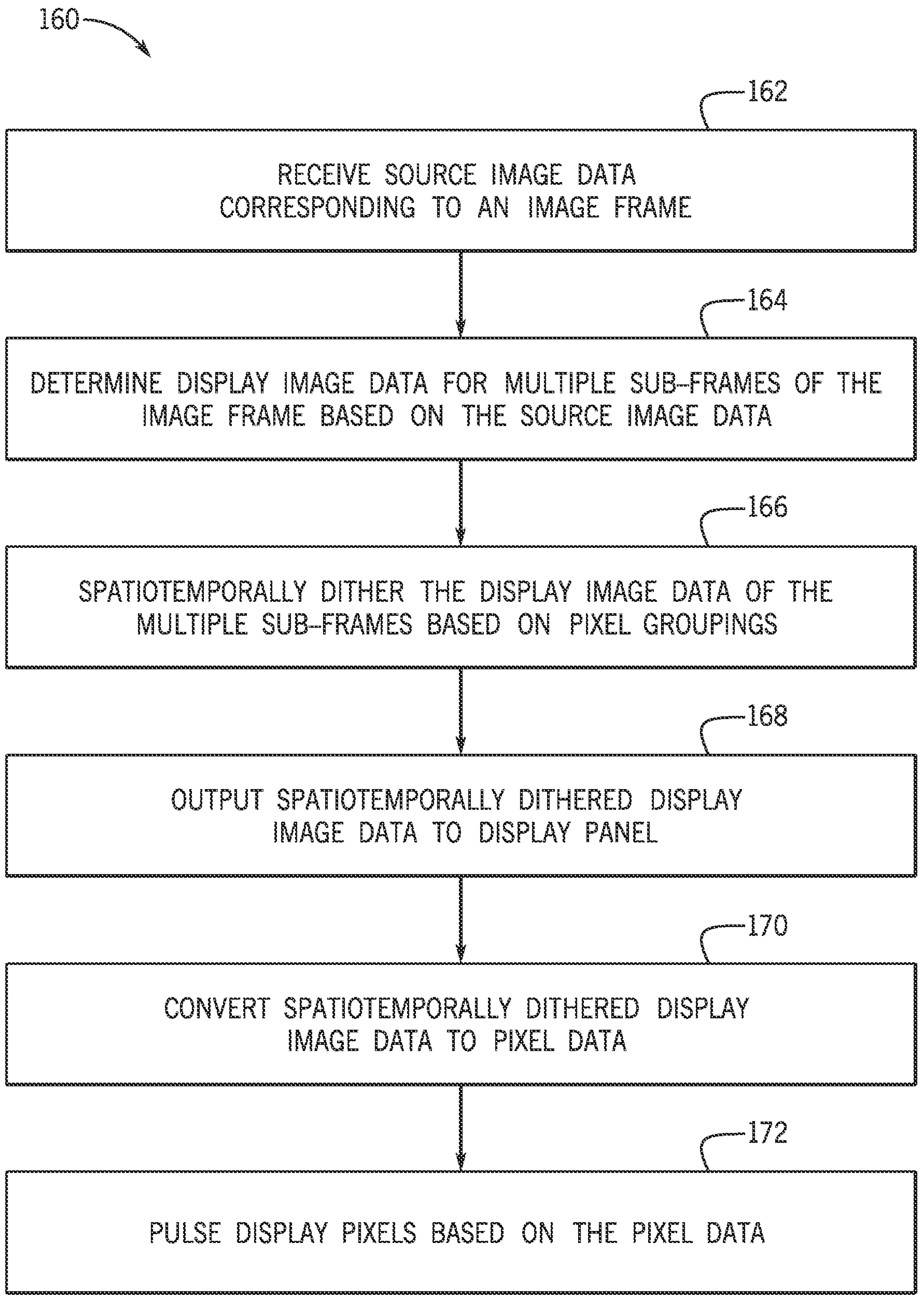
FIG. 16 is a flowchart of an example process for spatiotemporally dithering source image data and displaying the same, in accordance with an embodiment.

FIG. 16 is a flowchart 160 of an example process for spatiotemporally dithering source image data and displaying the same. For example, image processing circuitry 28 may receive source image data 128 corresponding to an image frame 104 (process block 162). The image processing circuitry 28 may determine display image data 44 for multiple sub-frames 110 of the image frame 104 based on the source image data 128 (process block 164). Additionally, a dither block 132 of the image processing circuitry 28 may spatiotemporally dither the display image data 44 based on pixel groupings 142 of the display pixels 52 (process block 166). For example, the sub-frame numberings of the display pixels 52 of a grouping 142 may be reordered to be out of phase relative to each other. Additionally, the image processing circuitry 28 may output the spatiotemporally dithered display image data 44 to the display panel 40, or support circuitry 42 thereof (process block 168). As should be appreciated, the dither block 132 of the image processing circuitry 28 may be incorporated into the support circuitry 42 of the display panel 40 or be implemented separately. Moreover, the spatiotemporally dithered display image data 44 may be converted to pixel data (process block 170), and the display pixels 52 may be pulsed to emit light based on the pixel data (process block 172).

Although the above referenced flowchart 160 is shown in a given order, in certain embodiments, process/decision blocks may be reordered, altered, deleted, and/or occur simultaneously. Additionally, the referenced flowchart 160 is given as an illustrative tool and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A device comprising:

a pulsed emission electronic display comprising a plurality of display pixels and configured to display a frame of image data over an image frame time by pulsing display pixels of the plurality of display pixels over a plurality of sub-frames within the image frame time based at least in part on display image data of the frame of image data; and image processing circuitry configured to generate the display image data based at least in part on source image data indicative of an image to be displayed during the image frame time, wherein the image processing circuitry is configured to dither an order of the plurality of sub-frames for a grouping of display pixels of the plurality of display pixels, wherein the dithered order of the plurality of sub-frames of each display pixel of the grouping of display pixels is out of phase relative to the dithered order of the plurality of sub-frames for other display pixels of the grouping of display pixels.

2. The device of claim 1, wherein the pulsed emission electronic display comprises a micro-light-emitting-diode (LED) display.

3. The device of claim 1, wherein the plurality of sub-frames comprises a first set of sub-frames associated with a first display pixel of the plurality of display pixels and a second set of sub-frames associated with a second display pixel of the plurality of display pixels, wherein the first display pixel and the second display pixel are part of a pixel grouping processed together.

4. The device of claim 3, wherein dithering the order of the plurality of sub-frames comprises spatiotemporally dithering the first set of sub-frames and the second set of sub-frames.

5. The device of claim 3, wherein a spatiotemporal averaged luminance output of the pixel grouping is equivalent to a luminance value of the source image data.

6. The device of claim 3, wherein the pixel grouping comprises a 2×2 pixel grouping.

7. The device of claim 1, wherein a frame rate of the image frame time is less than 60 Hertz.

8. The device of claim 1, wherein the pulsing of a display pixel of the plurality of display pixels over the plurality of sub-frames generates an aggregated luminance output equivalent to a luminance value of the source image data.

9. The device of claim 1, wherein the plurality of sub-frames comprises sixteen sub-frames within the image frame time.

10. The device of claim 1, wherein the grouping of display pixels comprises a set of immediately adjacent display pixels.

11. A method comprising:

receiving source image data for an image frame, the source image data comprising a plurality of luminance values corresponding to a grouping of pixels;

determining a plurality of sets of pixel values for a respective set of sub-frames of the image frame based at least in part on the source image data, wherein each pixel of the grouping of pixels is associated with a respective set of the plurality of sets of pixel values; and spatiotemporally dithering sub-frame orderings of the plurality of sets of pixel values for the grouping of pixels.

12. The method of claim 11, wherein the grouping of pixels comprises a plurality of immediately adjacent pixels on an electronic display.

13. The method of claim 11, comprising emitting one or more pulses of light at one or more respective sub-frames of the respective set of sub-frames from a pixel of the grouping of pixels based at least in part on a set of pixel values of the plurality of sets of pixel values.

14. The method of claim 13, comprising regulating a duration of a pulse of light of the one or more pulses of light based at least in part on a pixel value of the set of pixel values.

15. The method of claim 13, wherein an aggregate amount of light emitted from the pixel over one or more pulses is equivalent to a luminance value of the plurality of luminance values corresponding to the pixel.

16. The method of claim 11, wherein the grouping of pixels comprises pulsed emission display pixels.

17. A system comprising:

image processing circuitry configured to:

receive source image data for an image frame, the source image data comprising a plurality of luminance values corresponding to a grouping of display pixels;

determine a plurality of sets of pixel values for a respective set of sub-frames of the image frame based at least in part on the plurality of luminance values, wherein each display pixel of the grouping of display pixels is associated with a set of the plurality of sets of pixel values; and spatiotemporally dither the plurality of sets of pixel values for the grouping of display pixels; and an electronic display comprising the grouping of display pixels and configured to display the image frame by pulsing one or more display pixels of the grouping of display pixels over the respective set of sub-frames based at least in part on the spatiotemporally dithered plurality of sets of pixel values for the grouping of display pixels.

18. The system of claim 17, wherein pulsing the one or more display pixels comprises regulating a duration of a pulse based at least in part on a pixel value of a set of pixel values of the plurality of sets of pixel values.

19. The system of claim 17, wherein the grouping of display pixels comprises a plurality of micro-light-emitting-diodes (LEDs), and wherein the electronic display comprises a plurality of micro-drivers configured to operate the plurality of micro-LEDs.

20. The system of claim 17, wherein the grouping of display pixels consists of less than or equal to sixteen display pixels.

* * * * *